(12) United States Patent
Jones et al.

(10) Patent No.: US 9,713,175 B2
(45) Date of Patent: *Jul. 18, 2017

(54) OFFERING AND PROVISIONING SECURED WIRELESS VIRTUAL PRIVATE NETWORK SERVICES

(71) Applicant: Microsoft Corporation, Redmond, WA (US)

(72) Inventors: David Jones, Seattle, WA (US); Thomas W. Kuehnel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 699 days.

This patent is subject to a terminal disclaimer.

(21) Appl. No.: 13/762,392

(22) Filed: Feb. 8, 2013

(65) Prior Publication Data

US 2013/0151718 A1    Jun. 13, 2013

Related U.S. Application Data

(63) Continuation of application No. 11/413,573, filed on Apr. 28, 2006, now Pat. No. 8,392,560.

(51) Int. Cl.
*G06F 15/16* (2006.01)
*H04W 76/02* (2009.01)
*H04L 29/06* (2006.01)
*H04W 12/02* (2009.01)

(52) U.S. Cl.
CPC ......... *H04W 76/02* (2013.01); *H04L 63/0272* (2013.01); *H04L 63/162* (2013.01); *H04W 12/02* (2013.01)

(58) Field of Classification Search
CPC ................................ H04L 63/10; H04L 63/20
See application file for complete search history.

(56) References Cited

U.S. PATENT DOCUMENTS

| | | | |
|---|---|---|---|
| 2003/0097450 A1 | 5/2003 | Ogg et al. | |
| 2003/0204748 A1* | 10/2003 | Chiu | 713/201 |
| 2003/0236865 A1 | 12/2003 | Anthe et al. | |
| 2005/0260996 A1* | 11/2005 | Groenendaal | H04L 63/102 455/445 |

FOREIGN PATENT DOCUMENTS

EP    1420569 A2    5/2004

OTHER PUBLICATIONS

"Search Report Received for European Patent Application No. 07794460.1", Mailed Date: Nov. 21, 2014, 6 Pages.

* cited by examiner

*Primary Examiner* — Hua Fan

(57) ABSTRACT

An electronic device may present a user interface for making selections related to connecting to a network or selecting a network from a plurality of available networks. Additionally, a user interface may give a user an opportunity to secure to an open, unsecure, connection, for example, an ad-hoc wireless connection, such as may be found at a coffee shop. A selection of security offerings may be made from a user interface screen including pre-populated service providers. A user may be allowed to save preferences for connecting to new networks, as well as preferences related to previously used networks. Further, the user may save preferences for invoking security services on a per-network or pan-network basis. The security service may a known tunneling protocol (i.e. VPN), such as L2TP or PPTP.

12 Claims, 14 Drawing Sheets

1100

1102 — Network Security ...

Enter your information to sign up for MSN Secure

1104 —
*First name: [        ]
*Last name: [        ]
*Organization [        ]
Language [English ▽]

Already have an account?

[Sign In]

[Next] [Cancel]

OFFERING AND PROVISIONING SECURED WIRELESS VIRTUAL PRIVATE NETWORK SERVICES

RELATED APPLICATION

This application is a Continuation of prior application Ser. No. 11/413,573, filed Apr. 28, 2006, which is incorporated herein by reference.

BACKGROUND

Computer security and the security of data communications with a computer have been a concern for some time. The proliferation of portable computing devices, laptops, PDAs, and the like, has increased the opportunities for security breaches. Additionally, the widespread availability of open network access points, particularly wireless access points, has also increase the opportunities for security breaches. Mobile workers routinely use portable electronic devices in coffee shops, airport lounges, automobile rest stops, or even when visiting other corporation's networks during a business trip. Often, such mobile workers are faced with a choice of not completing their work or risking exposure of valuable or confidential data. Given such a choice, mobile workers often choose the latter and hope for the best.

Secure sockets (SSL or SSL2) may be used at an application level to secure communications between two applications, for example, a web browser and a payment server. However, an SSL connection is only effective for the single application level session.

Secure network services or virtual private networks (VPN), such as layer two tunneling protocol (L2TP) and point-to-point tunneling protocol (PPTP), allow security for all communication between endpoints over open (i.e. unsecure) networks. But, the set up and maintenance of such connections are cumbersome and often require either specific knowledge or administrator access.

SUMMARY

Electronic devices may be equipped with a connection manager for managing connections to available networks, especially wireless networks. The connection manager may monitor the available networks and evaluate their relative security. A user interface presenting the network selections to a user may indicate the nature of the connection with respect to security. When a selection of an open network is made, the user may be presented with an option to establish a secure network connection using a secure network service, e.g. VPN.

One or more secure network service offerings may be preprogrammed into the electronic device for selection by the user. The connection manager may be able to activate the selected secure network service, resulting in a secure connection with little or no action on the part of the user. User selections with respect to a particular network may be stored and automatically invoked when subsequently encountering that network. Similarly, user selections with respect to securing network connections may be stored and automatically invoked when using the particular network again or maybe automatically invoked for any network subsequently selected.

For example, an electronic device may always connect to its own business network when available and will not use other network options. The business network may not require a secure network service, while the electronic device may prefer a particular coffee shop network to a gas station network when both are available, but may opt to use a secure network service when connecting to either.

BRIEF DESCRIPTION OF THE DRAWINGS

FIG. 11 depicts a representative user interface screen for activating an account with a secure network service;

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
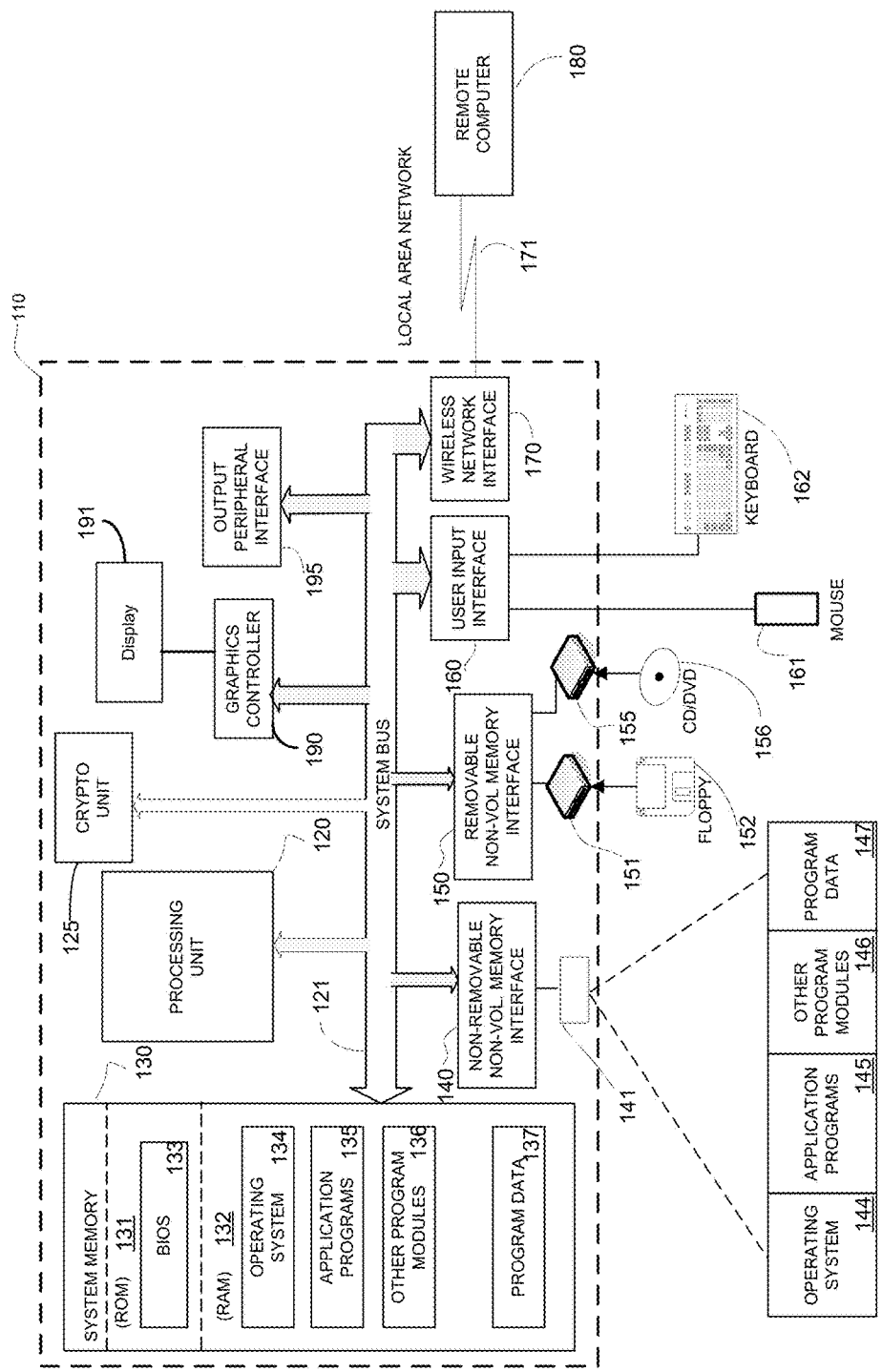
FIG. 1 depicts a simplified and representative block diagram of an electronic device.

FIG. 1 provides a structural basis for an electronic device suitable for performing the methods and hosting the computer-readable media related to the instant disclosure. The electronic device 110 may be a standard computer, but may also be a portable device suitable for use by a mobile worker. Exemplary electronic devices may include a laptop computer, a handheld computer, a personal digital assistant (PDA), a smart phone, and a voice-over-Internet-protocol (VoIP) appliance.

FIG. 1 illustrates a computing device in the form of an electronic device 110. Components of the electronic device 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Electronic device 110 typically includes a variety of computer readable media. Computer readable media can be any available media that can be accessed by electronic device 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by electronic device 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within electronic device 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The electronic device 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the electronic device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the electronic device 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A display device 191 is also connected to the system bus 121 via an interface, such as a graphics controller 190. In addition to the display 191, external electronic devices or peripherals may be connected to the electronic device 110 via output peripheral interface 195. Such peripheral output devices may include speakers or a printer (not depicted) although they are not generally used during mobile operation.

The electronic device 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the electronic device 110. The logical connections depicted in FIG. 1 include a local area network (LAN) 171, but may also include other networks, such as a wide area network or the Internet. Such networking environments are commonplace in offices, enterprise-wide computer networks, intranets, and peer-to-peer networks.

When used in a LAN networking environment, the electronic device 110 may be connected to the LAN 171 through a network interface or adapter 170. In a networked environment, program modules (not depicted) relevant to the electronic device 110, or portions thereof, may be stored in the remote memory storage device.

The communications connection 170 allows the device to communicate with other devices. The communications connection 170 is an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 2:
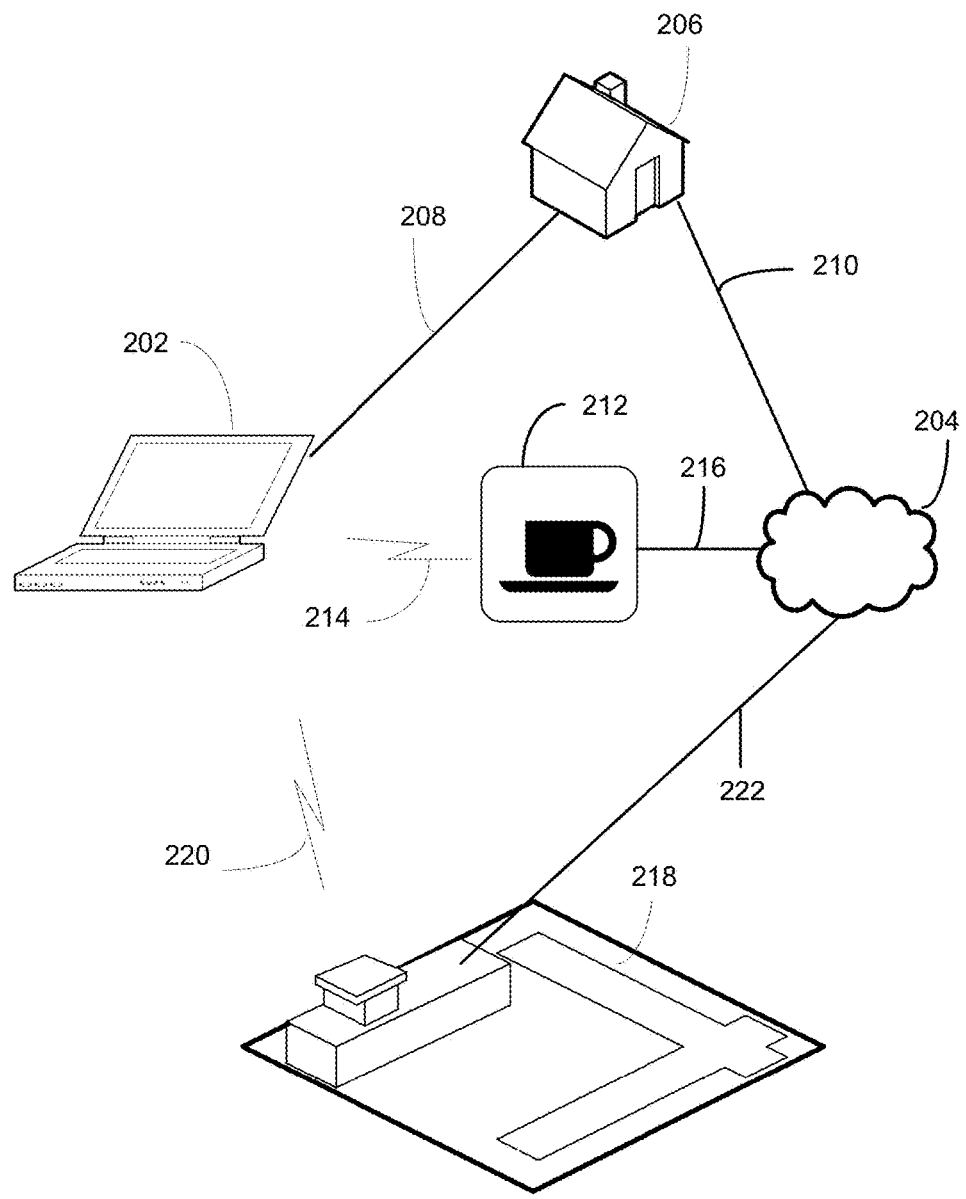
FIG. 2 depicts a network topology showing a variety of network connections.

FIG. 2 depicts a network topology showing a variety of network connections. An electronic device 202 is shown coupled through a number of networks, protocols, and media to a wide area network 204, such as the Internet, a corporate network, or an Internet service provider (ISP). The electronic device 202 may be the same or similar to the electronic device 110 of FIG. 1. The connections illustrated are not necessarily all available at the same time, nor is the electronic device 202 necessarily connected to more than one network at once, if connected at all.

FIG. 2 shows the electronic device 202 connected to a home network 206 via a wired connection 208, although wireless connections in home environments are increasingly common. A coffee shop 212 illustrates another network access location, in this exemplary embodiment, the connection between electronic device 202 and coffee shop 212 is over wireless connection 214. The coffee shop may be connected to the wide area network 204 over connection 216. Another access point may be represented by the airport 218. A wireless connection 220 may be used to couple the electronic device 202 with the airport 218 and subsequently, to the wide area network 204 over connection 222.

When the electronic device 202 is in range of a wireless network, e.g. networks 214 220, or is physically connected to a wired network, e.g. network 208, a user interface may be presented on the electronic device 202 to invite a user to select a network and, when the selected network is not secure, to add security to the network. The user interface and selection processes are discussed in more detail below with respect to FIGS. 4-13. Network security may include one or all of the elements of AAA, that is, authentication, authorization and accounting. For example, a secure network connection or VPN may guarantee that packets are not tampered or sniffed while enroute between endpoints.

Figure 3:
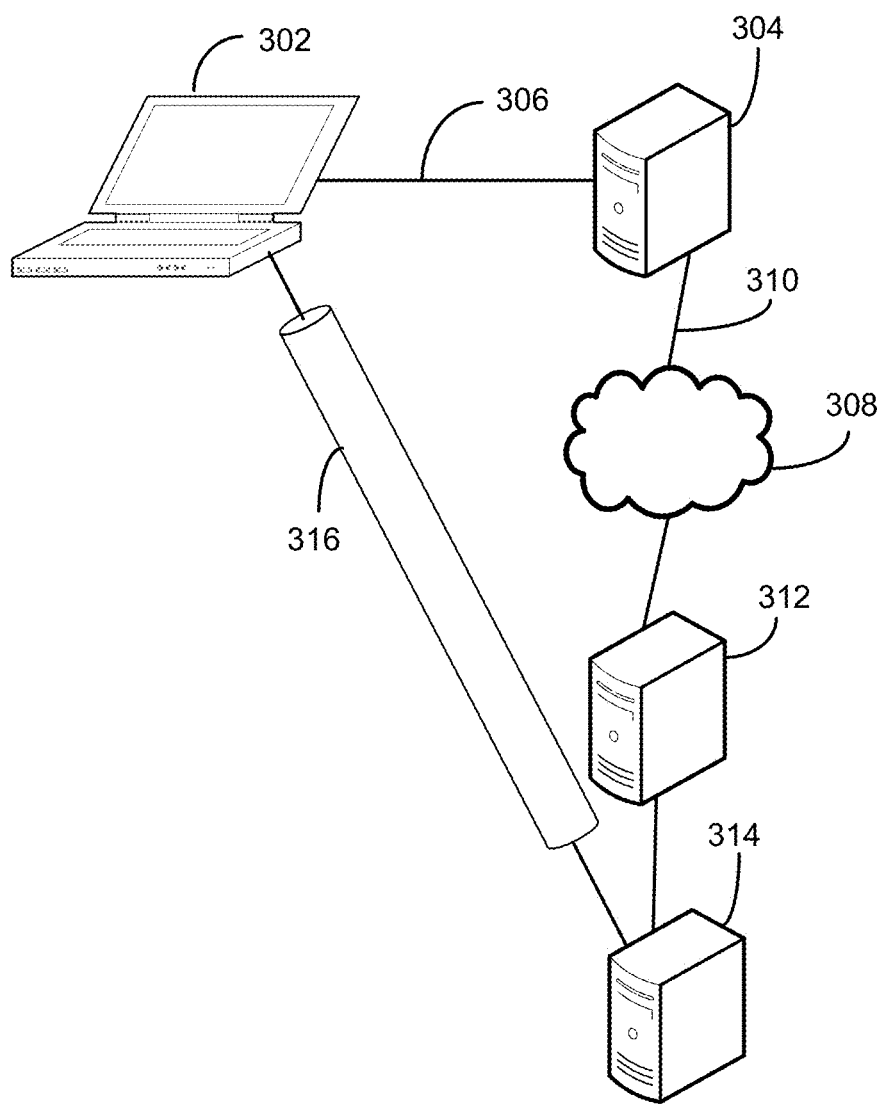
FIG. 3 depicts a simplified block diagram showing physical and logical connections between an electronic device and a server

FIG. 3 is a simplified and representative block diagram showing physical and logical connections between an electronic device and a network. An electronic device 302 may connect to a computer 304 over a network connection 306. The computer 304 may be an access point, a local access server (LAS), gateway, or the like. The network connection 306 may be wired or wireless, as shown in FIG. 2. The computer 304 may be connected to a wide area network 308, such as the Internet, or network connection 310. The wide area network 308 in turn may be connected to a service provider 312 and further to an endpoint computer 314. In some embodiments, the service provider 312 may not be present and the physical and logical connections may directly couple to endpoint computer 314.

A logical connection 316 may be made between electronic device 302 and the endpoint computer 314, even though the physical connection is via networks 306 310 and intermediate points 304 308 and, optionally 312. The logical connection 316 may use one of several specialized protocols for securing communication between end points. For example, a layer two tunneling protocol (L2TP), known in the art, encapsulates data coming from either endpoint 302 or 314 and passes it through the various physical networks in a secure fashion until it reaches the other endpoint and is the encapsulated in presented to the protocol stack of the receiving endpoint. Another such protocol is point-to-point tunneling protocol (PPTP).

In one embodiment, a client may be installed on the electronic device 302 for supporting set up, operation, and tear down of the client-side of the tunneling protocol when the service provider is present and a secure, trusted connection between endpoint computer 314 and service provider 312 exists, the secure communication connection 316 may terminate at the service provider 312. The service provider 312 may be a commercial service, a free service, or a service offered by an enterprise associated with its own users. Client-side application software from more than one service provider may be preinstalled on an electronic device 302 and presented for selection by user at the time a network connection is made. As will be discussed, both network selection and secure service preferences may be stored for future use.

In another embodiment, a series of software modules may support the operations associated with both connecting to a network, monitoring the security of the connection, and activating the services necessary to support a VPN connection. A network monitor module may be implemented to determine availability of a network, especially a wireless network. A presentation manager module may operate in conjunction with the network monitor and present the available networks. The presentation manager may also present network security offerings. A link manager module may be used to activate a selected security offering when the presentation manager receives selections from a user. The selections may include both a selection of a network and a selection security offering (e.g. vendor) or security requirement (e.g. a request for a VPN).

A setting manager module for saving settings corresponding to repeating selected behaviors when the network monitor determines subsequent availability of the wireless network. A pre-load manager module may store one or more network security offerings. As discussed below, one implementation of the pre-load manager may be an OEM pre-installation kit. A setting manager module may operate in conjunction with the presentation manager for saving settings corresponding to automatically securing all future network connections, when a response collected by the presentation manager indicates the user prefers to use a security service for unsecured network connections.

Figure 4:
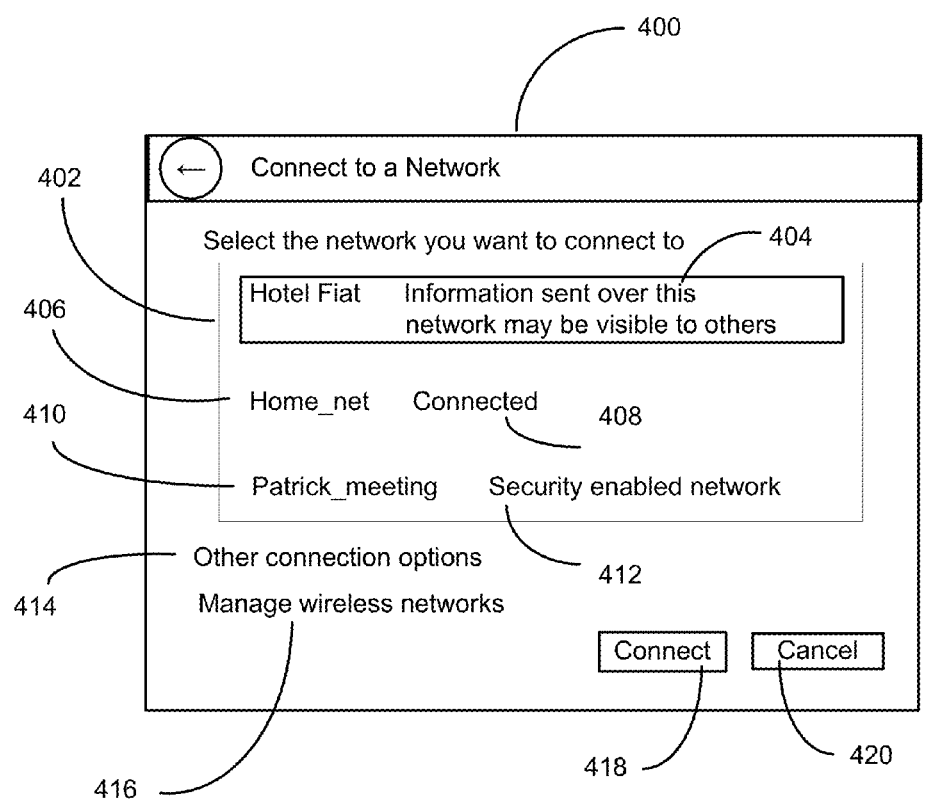
FIG. 4 depicts a representative user interface screen for selecting a network.

FIG. 4 depicts a user interface screen for selecting a network. Window 400 shows a series of networks have been detected as being available, specifically, a network 402 with an indication 404 that the connection may not be secure, a network 406 with an indication 408 that the host electronic device, such as electronic device 302 of FIG. 3, is already connected, and a network 410, for example, an ad hoc peer-to-peer network group, with an indication 412 that the network is available and has security enabled. Additional selections may include an option for other connections for hundred 14 and an option to manage wireless network 416. Connect 418 and cancel 420 buttons may be used to navigate from the window 400. For the purpose of our example, the user selects the HotelFiat network 402.

Figure 5:
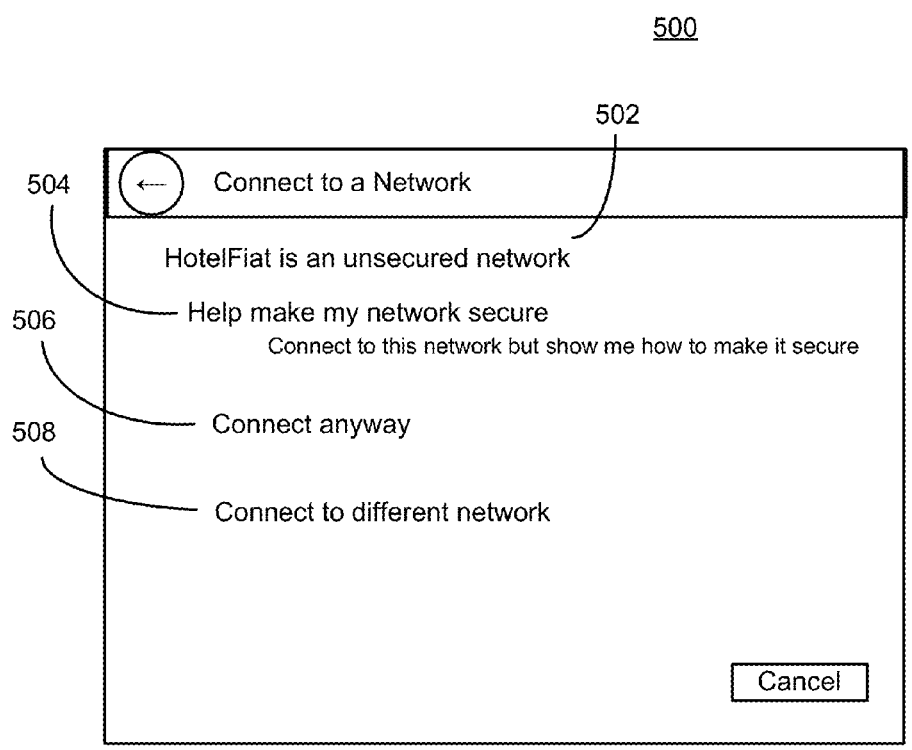
FIG. 5 depicts a representative user interface screen presenting network information.

FIG. 5, a representative user interface screen 500 presenting network information, is discussed and described. After receiving a selection of network, for example, at FIG. 4, a connection manager on the electronic device 302 may present information about the selected network. The interface screen 500 may notify a user via message 502 that the selected network, in this case HotelFiat, is unsecured. Options may be presented, for example, an offer to secure the network 504, an option to connect without security 506, and an offer to connect to another network 508. Selecting the offer to connect to another network 508 may, in effect, return the user to the screen of FIG. 4. To continue the example, the first selection 504 is chosen.

Figure 6:
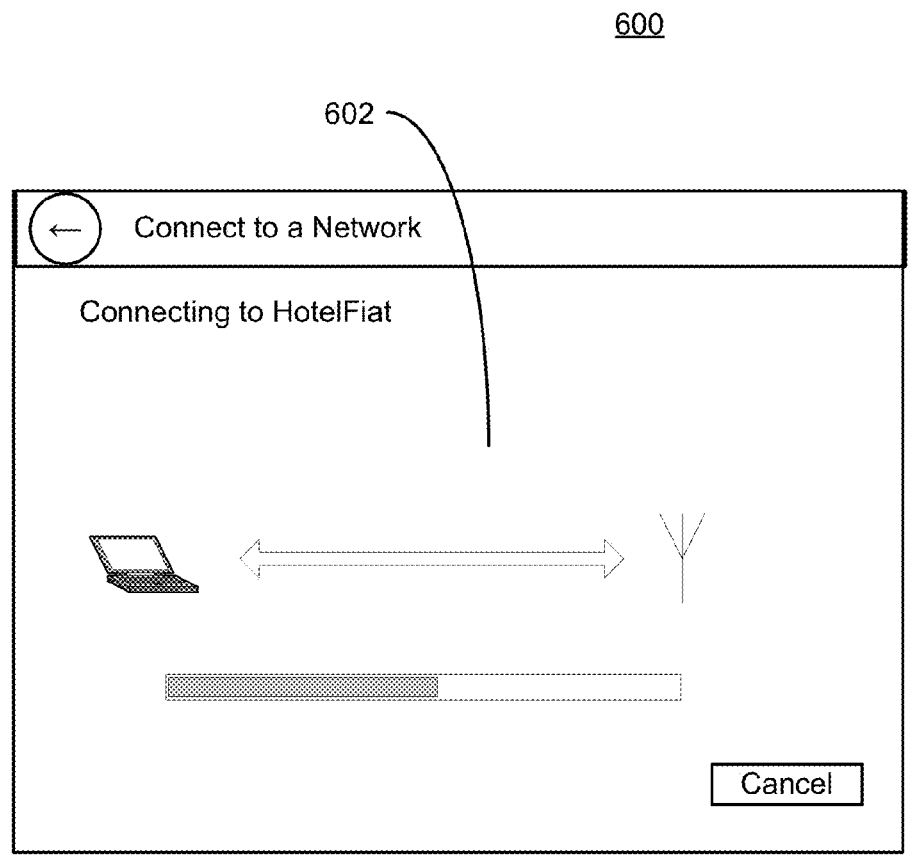
FIG. 6 depicts a representative user interface screen showing connection status.
Figure 7:
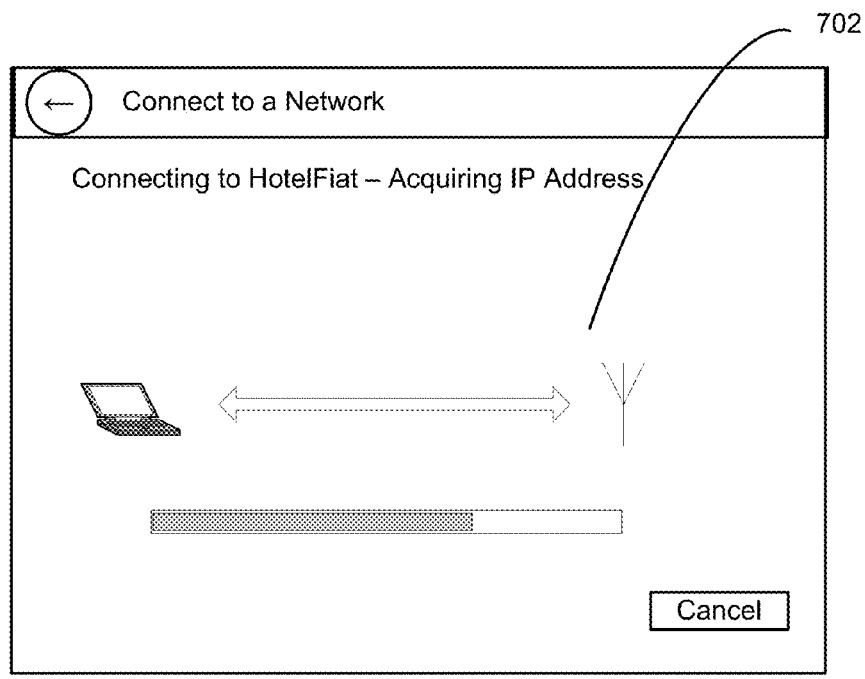
FIG. 7 depicts a representative user interface screen showing additional status.

FIG. 6 depicts a representative user interface screen 600 showing status 602. Similarly, FIG. 7 depicts a representative user interface screen 700 showing additional status 702.

Figure 8:
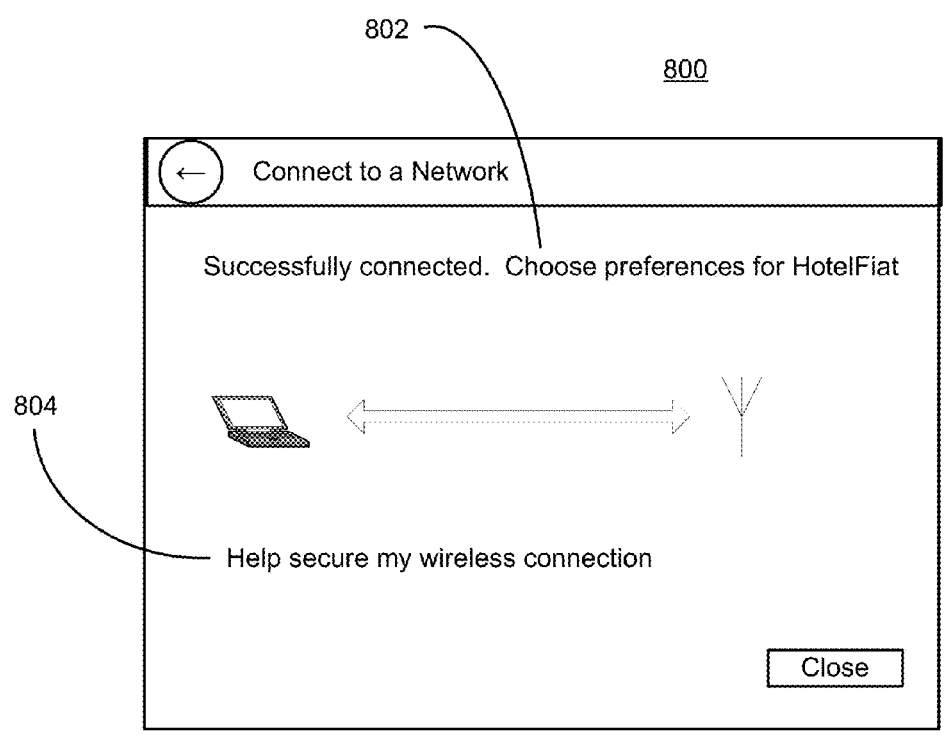
FIG. 8 depicts a representative user interface screen showing status and offering a secure option.

FIG. 8 shows a representative user interface screen 800 showing status 802 indicating the network connection has been completed. Because at FIG. 5, selection 504 was made requesting help in securing the connection, selection 804 may be presented. Selection 804 allows the user to continue securing the network. For this exemplary embodiment, selection 804 is chosen.

Figure 9:
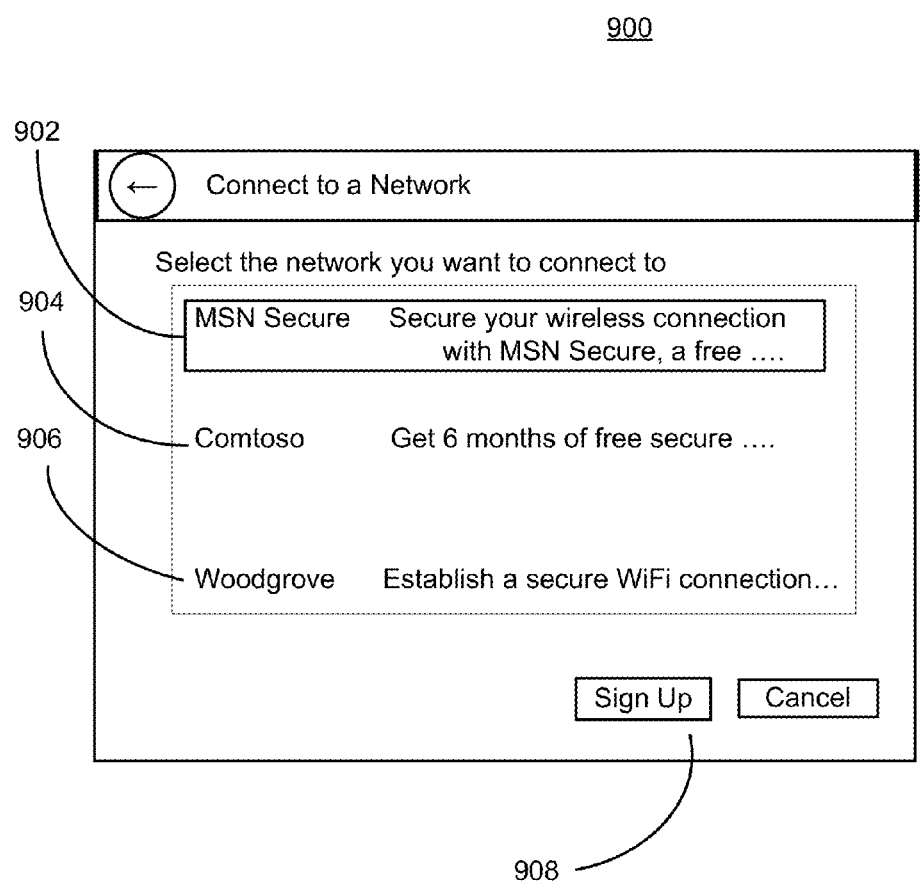
FIG. 9 depicts a representative user interface screen offering selections for secure network services.

FIG. 9 shows a representative user interface screen 900 offering selections for secure network connection. As discussed above, client software may be installed on the electronic device 302 supporting secure connections. The client software may be preinstalled at the time of manufacture or initial programming, may be downloaded post-manufacture, or even post-delivery to a consumer. Three exemplary network security selections are shown in FIG. 9, first provider 902, second provider 904, and third provider 906. At least one button 908 may be used to proceed.

When the client software is preinstalled, it may be pre-installed through an original equipment manufacturer (OEM) pre-installation kit, such as one available through Microsoft™, or an equivalent tool. The OEM pre-installation kit allows a product vendor to specify the kind of offer being made to a user, as well as specific text and graphics associated with the offer. Exemplary categories for offer pre-installation are shown below.

To provide OEMs the ability to alter the default behavior of the secure networks they may provide an XML binary large object (blob) that contains the following, or similar, information.

CustomVPNOffer: Determines option(s) for presentation to the user. When set to 1, the offer is presented, when set the 0, the offer is not presented.

CustomVPNTitleText: Customizes the text string description for the VPN offer page (replaces default string "To sign up now, select a wireless security provider")

CustomVPNIconPath: Location of the custom VPN service Icon (one for each entry).

CustomVPNdescription: Customizes the text string description/offer information.

CustomVPNlocation: Configures a custom shell execute path to launch the custom wireless VPN service installer/website.

Figure 10:
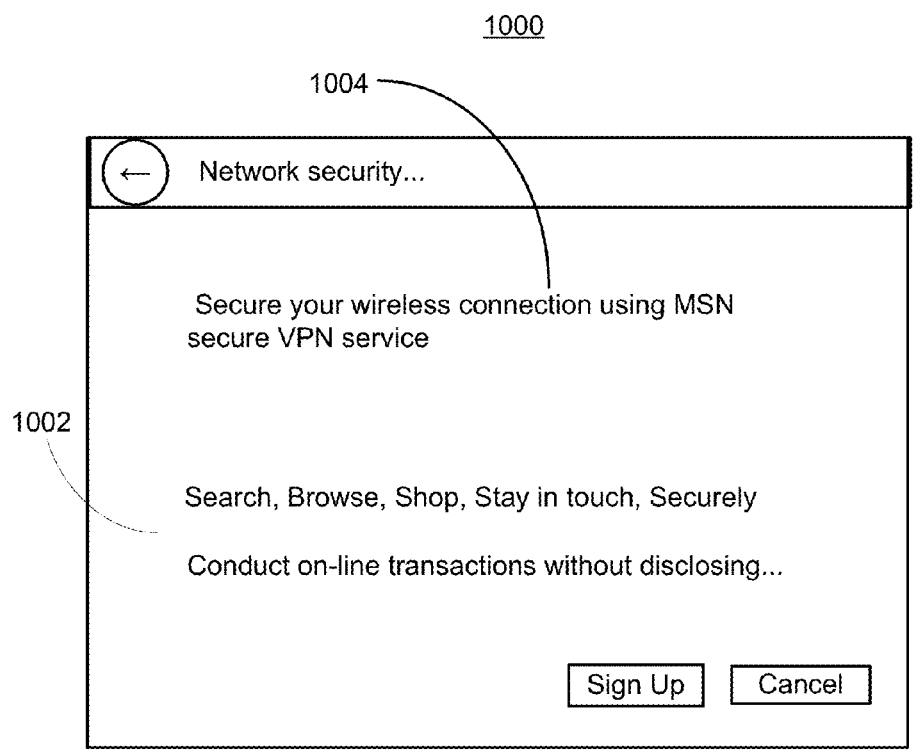
FIG. 10 depicts a representative user interface screen for connecting to a secure network service.

FIG. 10 depicts a representative user interface screen 1000 for connecting to a secure network service allowing presentation of additional details 1002 by the offer provider and confirmation 1004 of the selected service by the user.

FIG. 11 depicts a representative user interface screen 1100 for activating an account with a secure network service. After confirming the selection of the service at FIG. 10, interface screen 1100 may be presented to allow the user to complete registration fields 1102 and select a language using drop down box 1104. When completed, the button 1106 allows proceeding to the next screen.

Figure 12:
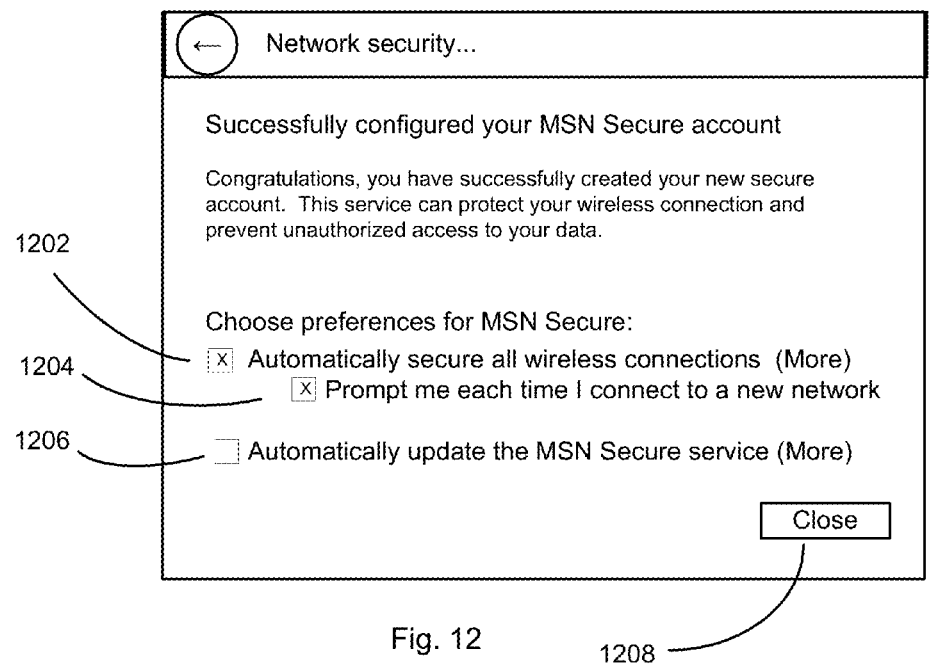
FIG. 12 depicts a representative user interface screen for storing secure network service settings.

FIG. 12 depicts a representative user interface screen 1200 for storing secure network service settings. Several selections may be chosen by a user for subsequent use when connecting to networks, including wireless networks. Selection 1202 allows a user to automatically secure all future network connections. When selection 1202 is chosen, selection 1204 allows the user to require the presentation of prompts related to securing networks that have not been previously accessed. Selection 1206 allows the particular secure service to perform automatic updates. When selections have been completed, selection button 1208 may be used close the window and proceed.

Figure 13:
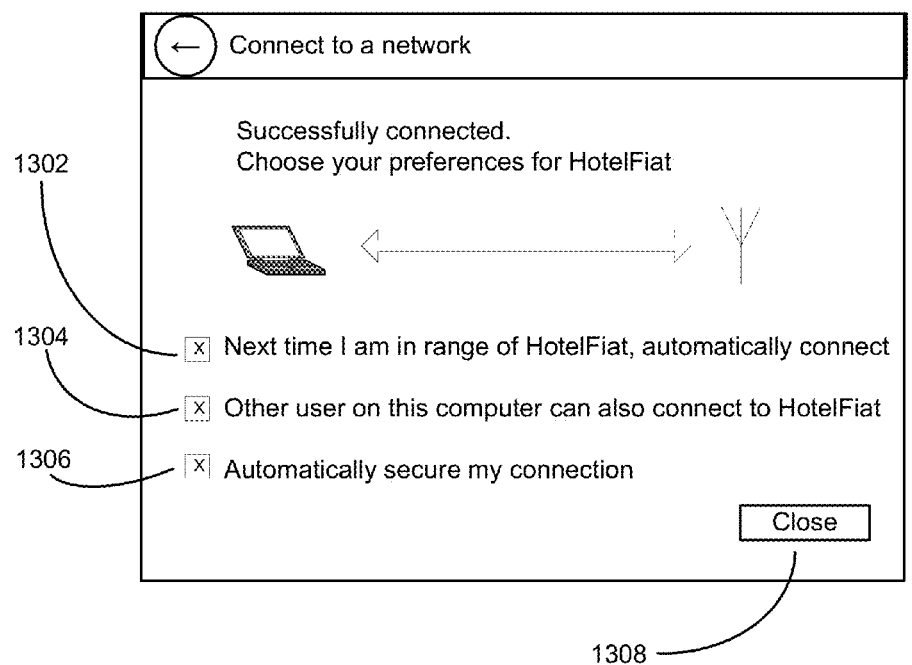
FIG. 13 depicts a representative user interface screen for storing network connection settings.

FIG. 13 is a representative user interface screen 1300 for storing network connection settings for a particular network. Selection 1302 specifies that the currently selected network, in the exemplary embodiment, the network 'HotelFiat,' should be automatically connected whenever it is available in the future. Selection 1304 allows the user to specify that other users of the same electronic device 302 can also connect to the selected network. Selection 1306 allows a user to specify automatically securing future all connections with the selected network, in this example, 'HotelFiat.' The button 1308 may be used to close the window and continue normal operation. The selections made in FIGS. 12 and 13 may be used by future sessions for determining how to handle known networks as they become available.

Figure 14:
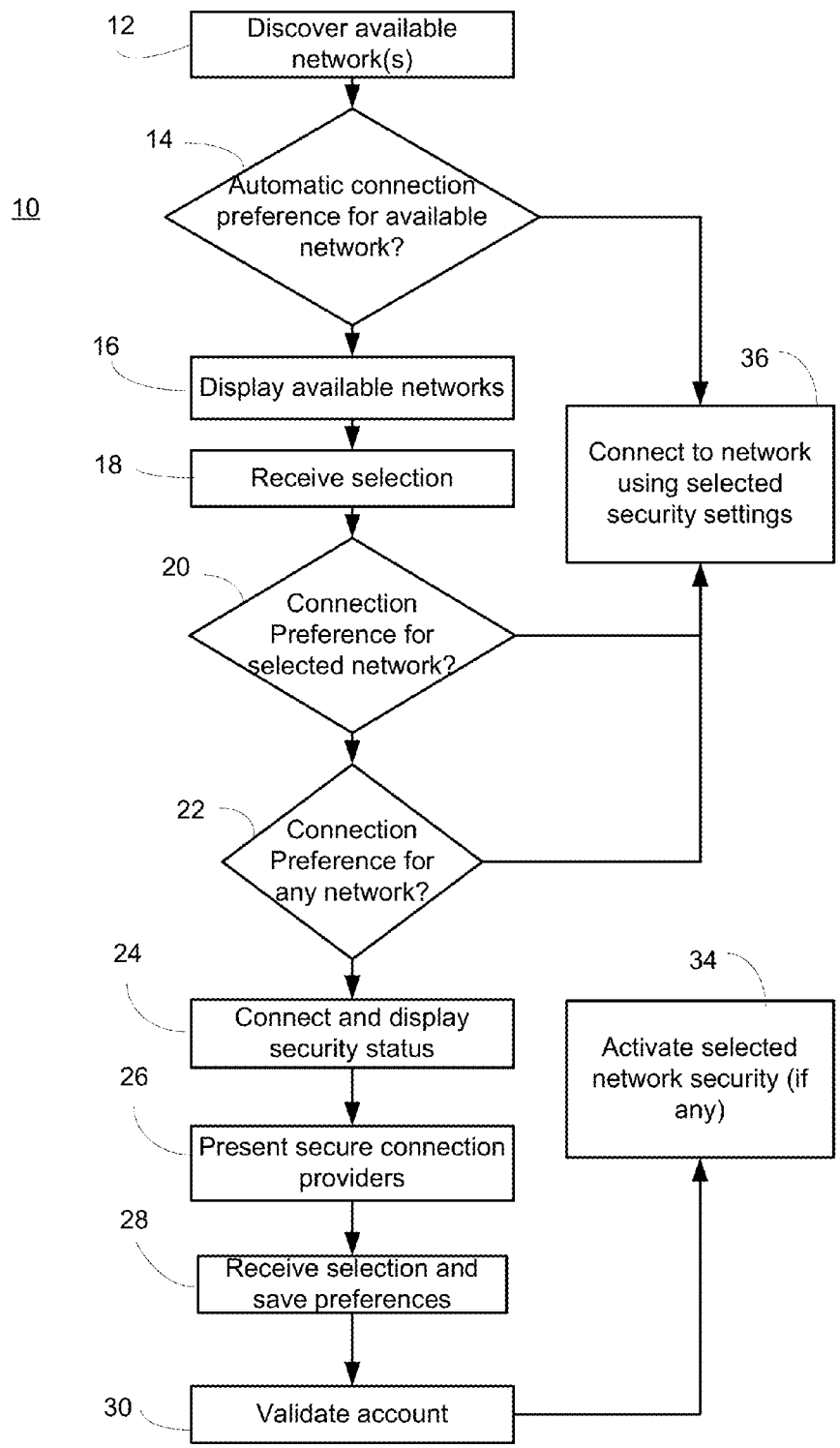
FIG. 14 depicts a flowchart of an exemplary method for selecting and securing network connections and storing related preferences.

FIG. 14 depicts a flowchart of an exemplary method 10 for selecting and securing network connections and storing related preferences. At block 12, a connection manager, or similar component, may discover one or more networks and determine when at least one network is available for a connection. At block 14, a value corresponding to network settings may be read to determine if instructions, or preferences, are available related to any of the networks discovered at block 12. If prior instructions or preferences are found, they may be followed and may specify that one of the networks is to automatically be connected and perhaps automatically secured.

If no instructions are available at block 14, a user interface may be invoked at block 16 to display the available networks and, at block 18, to receive a selection of a network to connect with, or to receive a selection to not connect with any network.

When a network is selected, preferences may again be checked at block 20 to determine if a connection preference has been made for that particular selected network, for example, to always secure a connection to that particular network. When no preferences are found for the particular selected network, at block 22 a determination may be made whether there is a connection preference for any network in general, obviously, including the currently selected network. When no general connection preference is found, the selected network may be connected and the security status displayed at block 24.

If the user requested help in securing the network connection at either block 18 or at block 24, a user interface may be displayed at block 26 offering to secure the network connection. When more than one secure network service provider has been provisioned, the user may make a selection from the choices available and the selection received at block 28. When indicated by the user, the selections made at block 28 may be saved for future reference when subsequently connecting to the same network, or for further use when determining to secure connections to other, new, networks.

When required, an account validation process may be completed at block 30 and the network may be secured, for example, using a L2TP or PPTP tunneling protocol at block 34.

When preferences for network connection are found at blocks 14, 20, or 22, a connection to the preferred network may be made at block 36, and, when so indicated, the connection secured.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A computer comprising:
   a wireless network interface;
   processing hardware;
   storage hardware storing instructions executable by the processing hardware and configured to, when executed by the processing hardware, perform a process comprising:
      monitoring, according to signals from the wireless network interface, for the presence of wireless networks to maintain a list of wireless networks presently available to form network-level connections for the computer;
      determining security statuses of the respective wireless networks in the list;
      displaying a presentation manager user interface that is coupled with the list provided by the monitoring by displaying graphic representations;
      accessing records, in the storage hardware, of secured-connection virtual private network (VPN) service providers, each secured-connection VPN service having a respective record thereof, and based on the records, responsive to either (i) a user selection of one of the graphic representations or (ii) establishment of a network connection through a correspondingly selected wireless network, and also responsive to a determination that the correspondingly selected wireless network is not secured by any secured-connection VPN service provider, displaying user-selectable indicators of the respective secured-connection VPN service providers, the secured-connection VPN service providers offering respective VPN connectivity services that secure network-level connections provided by the wireless networks, and wherein the secured-connection VPN service providers do not provide the wireless networks; and
      responding to a user selection of one of the user-selectable indicators of a secured-connection VPN service provider, activating a corresponding network security module on the computer, the network security module configured to implement the VPN connectivity services offered by the secured-connection VPN service providers.

2. The computer of claim 1, the process further comprising saving, to the storage hardware, settings corresponding to repeating selected behaviors based on the monitoring determining subsequent availability of the one or more wireless networks.

3. The computer of claim 1, wherein the records comprise respective activation information, the process further comprising configuring the computer to use the selected secured-connection VPN service provider based on the activation information in the record of the selected secured-connection VPN service provider.

4. The computer of claim 1, the process further comprising saving settings that cause the computer to automatically secure all wireless network connections using the selected VPN connectivity service, responsive to a user input to automatically secure wireless network connections of the computer.

5. The computer of claim 1, wherein a VPN connectivity service comprises a layer-two tunneling protocol secured service, and wherein the network security module is configured to secure arbitrary network-level connections for any of the wireless networks by implementing a corresponding layer-two tunneling protocol.

6. The computer of claim 5, wherein the layer-two tunneling protocol is implemented with a point-to-point tunneling protocol.

7. A method performed by a computer having a wireless network interface, the method comprising:
   determining availability of one or more wireless networks to form network-level connections for the computer;
   indicating the availability of the one or more wireless networks by displaying, in a graphical user interface, graphic representations thereof, and responding to a user selection of one of the graphic representations by determining that the correspondingly selected wireless network is not associated with any virtual private network (VPN) connectivity securement service and by displaying user-selectable indicators of respective service providers that offer respective VPN connectivity securement services to secure network-level connections, wherein each VPN connectivity securement service is able to secure network-level connections for arbitrary wireless networks; and responsive to a user selecting one of the user-selectable indicators of a service provider, activating a corresponding network security module on the computer, the network security module implementing a VPN connectivity securement service offered by one of the service providers, and storing an association between the service provider and the selected wireless network, the association causing a second connection to the selected wireless network to automatically be secured by the VPN connective securement service of the service provider.

8. A method according to claim 7, further comprising storing on the computer preference information indicating that the user has selected the service provider, and based on the stored preference information, automatically using the VPN connectivity securement service of the selected service provider to secure use of the wireless networks by the computer.

9. A method according to claim 8, further comprising, based on presence of the preference information, automatically using the network security module in response to detecting that a particular wireless network is available.

10. A method according to claim 7, further comprising securing a wireless network connection using the network security module.

11. A method according to claim 7, further comprising determining whether a wireless network found to be available has been previously used by the computer.

12. A method according to claim 11, further comprising automatically displaying the interactive user interface responsive to the determining that the wireless network found to be available has not previously used by the computer.

* * * * *